(12) United States Patent
Li et al.

(10) Patent No.: US 10,289,472 B2
(45) Date of Patent: May 14, 2019

(54) RESOURCE LEAK DETECTION METHOD, APPARATUS, AND SYSTEM

(71) Applicant: Huawei Technologies Co., Ltd., Shenzhen (CN)

(72) Inventors: Jinghui Li, Shenzhen (CN); Jianqing Yuan, Shenzhen (CN); Xuewen Gong, Shenzhen (CN); Youzhan Yin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 15/441,837

(22) Filed: Feb. 24, 2017

(65) Prior Publication Data

US 2017/0168886 A1 Jun. 15, 2017

Related U.S. Application Data

(63) Continuation of application No. PCT/CN2015/079872, filed on May 27, 2015.

(30) Foreign Application Priority Data

Aug. 26, 2014 (CN) .......................... 2014 1 0425600

(51) Int. Cl.
*G06F 11/00* (2006.01)
*G06F 11/07* (2006.01)
(Continued)

(52) U.S. Cl.
CPC .......... *G06F 11/079* (2013.01); *G06F 11/073* (2013.01); *G06F 11/0793* (2013.01);
(Continued)

(58) Field of Classification Search
CPC .. G06F 11/079; G06F 11/073; G06F 11/0793; G06F 11/3037; G06F 11/3453; G06F 11/36; G06F 11/3612
See application file for complete search history.

(56) References Cited

U.S. PATENT DOCUMENTS 8,467,281 B1 6/2013 Colon et al.
2005/0268286 A1* 12/2005 Obata ................... G06F 11/366
717/124
(Continued)

FOREIGN PATENT DOCUMENTS

CN 1466057 A 1/2004
CN 101162436 A 4/2008
(Continued)

OTHER PUBLICATIONS

Machine Translation and Abstract of Chinese Publication No. CN101908018, Dec. 8, 2010, 5 pages.
(Continued)

*Primary Examiner* — Joseph D Manoskey
(74) *Attorney, Agent, or Firm* — Conley Rose, P.C.

(57) ABSTRACT

Embodiments of the present disclosure disclose a resource leak detection method, apparatus, and system that includes obtaining a target resource called when target code of a program runs, where the target code is partial code in program code, determining a first storage resource amount occupied by the target resource, determining whether the first storage resource amount occupied by the target resource satisfies a first preset condition, and if the first storage resource amount occupied by the target resource satisfies the first preset condition, determining a storage location of the target code as a resource leak location. In the embodiments of the present disclosure, the target code of the program can be tracked, and further, by means of detection, the storage
(Continued)

location of the target code can be determined as the resource leak location.

10 Claims, 4 Drawing Sheets

(51) Int. Cl.
*G06F 11/36* (2006.01)
*G06F 11/30* (2006.01)
*G06F 11/34* (2006.01)

(52) U.S. Cl.
CPC ...... *G06F 11/3037* (2013.01); *G06F 11/3452* (2013.01); *G06F 11/36* (2013.01); *G06F 11/3612* (2013.01)

(56) References Cited

U.S. PATENT DOCUMENTS

| | | | |
|---|---|---|---|
| 2007/0271418 A1* | 11/2007 | Sridharan | G06F 11/0748 711/146 |
| 2008/0178189 A1* | 7/2008 | Findeisen | G06F 9/5016 718/104 |
| 2009/0328007 A1 | 12/2009 | Chen et al. | |
| 2011/0107297 A1 | 5/2011 | Chandra et al. | |
| 2012/0216076 A1 | 8/2012 | Macik et al. | |
| 2013/0054923 A1* | 2/2013 | Bradley | G06F 11/3636 711/170 |
| 2013/0055034 A1 | 2/2013 | Qiu et al. | |
| 2013/0145220 A1* | 6/2013 | Lv | G06F 11/073 714/47.1 |
| 2013/0211762 A1 | 8/2013 | Taskov | |
| 2014/0089627 A1 | 3/2014 | Vaishampayan et al. | |
| 2014/0215483 A1 | 7/2014 | Akimoto et al. | |

FOREIGN PATENT DOCUMENTS

| | | |
|---|---|---|
| CN | 101539870 A | 9/2009 |
| CN | 101615143 A | 12/2009 |
| CN | 101908018 A | 12/2010 |
| CN | 102955719 A | 3/2013 |
| CN | 103268278 A | 8/2013 |
| CN | 103268287 A | 8/2013 |
| CN | 103488544 A | 1/2014 |
| CN | 103810062 A | 5/2014 |
| CN | 103914376 A | 7/2014 |
| JP | 2001331368 A | 11/2001 |
| JP | 2013109756 A | 6/2013 |
| JP | 2014149606 A | 8/2014 |
| WO | 2012122672 A1 | 9/2012 |

OTHER PUBLICATIONS

Machine Translation and Abstract of Chinese Publication No. CN1466057, Jan. 7, 2004, 5 pages.
Machine Translation and Abstract of Chinese Publication No. CN101162436, Apr. 16, 2008, 6 pages.
Machine Translation and Abstract of Chinese Publication No. CN101539870, Sep. 23, 2009, 10 pages.
Machine Translation and Abstract of Chinese Publication No. CN103488544, Jan. 1, 2014, 11 pages.
Machine Translation and Abstract of Chinese Publication No. CN103810062, May 21, 2014, 10 pages.
Foreign Communication From a Counterpart Application, European Application No. 15834959.7, Extended European Search Report dated Jul. 5, 2017, 8 pages.
Foreign Communication From a Counterpart Application, PCT Application No. PCT/CN2015/079872, English Translation of International Search Report dated Aug. 3, 2015, 2 pages.
Foreign Communication From a Counterpart Application, PCT Application No. PCT/CN2015/079872, English Translation of Written Opinion dated Aug. 3, 2015, 5 pages.
Machine Translation and Abstract of Chinese Publication No. CN103268278, Aug. 28, 2013, 15 pages.
Machine Translation and Abstract of Japanese Publication No. JP2001331368, Nov. 30, 2001, 13 pages.
Foreign Communication From a Counterpart Application, Japanese Application No. 2017-511234, Japanese Office Action dated May 29, 2018, 4 pages.
Foreign Communication From a Counterpart Application, Japanese Application No. 2017-511234, English Translation of Japanese Office Action dated May 29, 2018, 4 pages.

* cited by examiner

RESOURCE LEAK DETECTION METHOD, APPARATUS, AND SYSTEM

CROSS-REFERENCE TO RELATED APPLICATIONS

This application is a continuation of International Application No. PCT/CN2015/079872, filed on May 27, 2015, which claims priority to Chinese Patent Application No. 201410425600.2, filed on Aug. 26, 2014, both of which are hereby incorporated by reference in their entireties.

TECHNICAL FIELD

The present disclosure relates to the field of computers, and in particular, to a resource leak detection method, apparatus, and system.

BACKGROUND

In a running process, a program usually calls some resources such as memory, a file handle, a semaphore, a message capsule, and a database connection pool, and after running of the program ends, the called resources need to be released in time. A resource leak refers to that due to a problem such as release omission or invalid memory access, a program cannot release resources that are no longer used, and consequently the resources cannot be reused. As resources are constantly leaked, there are fewer available resources in a system, and as a result, system performance degrades, and finally, the system even cannot provide a service or process a service because the resources are insufficient.

Typically, during memory allocation, a quantity of times memory is allocated and a size of allocated memory are recorded in a log file, during memory release, a quantity of times memory is released and a size of released memory are recorded in a log file, and a quantity of times memory is not released and a size of unreleased memory are determined according to the quantity of times memory is allocated, the size of allocated memory, the quantity of times memory is released, and the size of released memory that are recorded. In this way, a memory leak is detected. All memory allocation and memory release need to be tracked and recorded, which causes high detection overheads and low efficiency. However, these methods can only be used at a test stage or a debug stage of a program, and memory leak detection cannot be performed in an online environment in which the program actually runs, a memory leak that is relatively difficult to find and that occurs when the program actually runs cannot be detected, and an undetected memory leak causes damage to a service or even interrupts the service.

SUMMARY

Embodiments of the present disclosure provide a resource leak detection method, apparatus, and system, which can reduce performance overheads, and improve resource leak detection efficiency.

A first aspect of the embodiments of the present disclosure provides a resource leak detection method, including obtaining a target resource called when target code of a program runs, where the target code is partial code in program code, determining a first storage resource amount occupied by the target resource, determining whether the first storage resource amount occupied by the target resource satisfies a first preset condition, where the first preset condition is set as follows the first storage resource amount occupied by the target resource constitutes a resource leak, and if the first storage resource amount occupied by the target resource satisfies the first preset condition, determining a storage location of the target code as a resource leak location.

In a first possible implementation manner of the first aspect, the target resource includes at least two target sub-resources, the target sub-resources are partial resources that are called in a process of running the target code and that are in the target resource, and the method further includes obtaining a calling path on which the target sub-resource is called when the target code runs, determining a proportion value that the target sub-resource accounts for in the first storage resource amount, determining whether the proportion value that the target sub-resource accounts for in the first storage resource amount satisfies a second preset condition, where the second preset condition is set as follows the proportion value that the target sub-resource accounts for in the first storage resource amount constitutes a resource leak and if the proportion value that the target sub-resource accounts for in the first storage resource amount satisfies the second preset condition, determining the calling path, on which the target sub-resource is called, as a resource leak calling path.

In a second possible implementation manner of the first aspect, the first preset condition includes a first preset threshold or a first preset increase rule, the first preset threshold is set such that the first storage resource amount is greater than a minimum value, which constitutes a resource leak, of the first storage resource amount, and the first preset increase rule is set as follows an increase trend change of the first storage resource amount in a resource period constitutes a resource leak, where the resource period is a life cycle in which the target resource occupies storage space, and the determining whether the first storage resource amount occupied by the target resource satisfies a first preset condition includes determining whether the first storage resource amount occupied by the target resource is greater than the first preset threshold, and if the first storage resource amount occupied by the target resource is greater than the first preset threshold, determining that the first storage resource amount occupied by the target resource satisfies the first preset condition, or determining whether the first storage resource amount occupied by the target resource satisfies the first preset increase rule in the resource period, and if the first storage resource amount occupied by the target resource satisfies the first preset increase rule in the resource period, determining that the first storage resource amount occupied by the target resource satisfies the first preset condition.

With reference to the first possible implementation manner of the first aspect, in a third possible implementation manner of the first aspect, the second preset condition includes a second preset threshold or a second preset increase rule, the second preset threshold is set such that a proportion value of the first storage resource amount is greater than a minimum value, which constitutes a resource leak, of the proportion value that the target sub-resource accounts for in the first storage resource amount, and the second preset increase rule is set as follows an increase trend change of the proportion value that the target sub-resource accounts for in the first storage resource amount in a resource period constitutes a resource leak, where the resource period is a life cycle in which the target resource occupies storage space, and the determining whether the proportion value that the target sub-resource accounts for in the first storage resource amount satisfies a second preset condition includes determining whether the proportion value that the target sub-resource accounts for in the first storage resource amount is greater than the second preset threshold, and if the proportion value that the target sub-resource accounts for in the first storage resource amount is greater than the second preset threshold, determining that the proportion value that the target sub-resource accounts for in the first storage resource amount satisfies the second preset condition, or determining whether the proportion value that the target sub-resource accounts for in the first storage resource amount satisfies the second preset increase rule in the resource period, and if the proportion value that the target sub-resource accounts for in the first storage resource amount satisfies the second preset increase rule in the resource period, determining that the proportion value that the target sub-resource accounts for in the first storage resource amount satisfies the second preset condition.

In a fourth possible implementation manner of the first aspect, the storage location of the target code includes at least two storage location units, each of the storage location units stores sub-code, the sub-code stored in the at least two storage location units constitutes the target code, and the method further includes obtaining a target sub-resource called when the sub-code stored in the storage location unit runs, where target sub-resources called when the sub-code stored in the at least two storage location units runs constitute the target resource, determining a proportion value that the target sub-resource, which is called when the sub-code stored in the storage location unit runs, accounts for in the first storage resource amount, determining whether the proportion value satisfies a third preset condition, where the third preset condition is set as follows the proportion value that the target sub-resource, which is called when the sub-code stored in the storage location unit runs, accounts for in the first storage resource amount constitutes a resource leak and if the proportion value satisfies the third preset condition, determining the storage location unit as a resource leak location unit.

With reference to the fourth possible implementation manner of the first aspect, in a fifth possible implementation manner of the first aspect, the third preset condition includes a third preset threshold or a third preset increase rule, the third preset threshold is set such that the proportion value that the target sub-resource accounts for in the first storage resource amount is greater than a minimum value, which constitutes a resource leak, of the proportion value that the target sub-resource accounts for in the first storage resource amount, and the third preset increase rule is set as follows an increase trend change of the proportion value that the target sub-resource accounts for in the first storage resource amount in a resource period constitutes a resource leak, where the resource period is a life cycle in which the target resource occupies storage space, and the determining whether the proportion value satisfies the third preset condition includes determining whether the proportion value is greater than the third preset threshold, and if the proportion value is greater than the third preset threshold, determining that the proportion value satisfies the third preset condition, or determining whether the proportion value satisfies the third preset increase rule in the resource period, and if the proportion value satisfies the third preset increase rule in the resource period, determining that the proportion value satisfies the third preset condition.

A second aspect of the embodiments of the present disclosure provides a resource leak detection apparatus, including a first obtaining module configured to obtain a target resource called when target code of a program runs, where the target code is partial code in program code, a first determining module configured to determine a first storage resource amount occupied by the target resource, and a first judging module configured to determine whether the first storage resource amount occupied by the target resource satisfies a first preset condition, where the first preset condition is set as follows the first storage resource amount occupied by the target resource constitutes a resource leak, and a leak location determining module configured to when a determining result of the first judging module is yes, determine a storage location of the target code as a resource leak location.

In a first possible implementation manner of the second aspect, the target resource includes at least two target sub-resources, the target sub-resources are partial resources that are called in a process of running the target code and that are in the target resource, and the apparatus further includes a second obtaining module configured to obtain a calling path on which the target sub-resource is called when the target code runs, a second determining module configured to determine a proportion value that the target sub-resource accounts for in the first storage resource amount, a second judging module configured to determine whether the proportion value that the target sub-resource accounts for in the first storage resource amount satisfies a second preset condition, where the second preset condition is set as follows the proportion value that the target sub-resource accounts for in the first storage resource amount constitutes a resource leak and a leak path determining module configured to when a determining result of the second judging module is yes, determine the calling path, on which the target sub-resource is called, as a resource leak calling path.

In a second possible implementation manner of the second aspect, the first preset condition includes a first preset threshold or a first preset increase rule, the first preset threshold is set such that the first storage resource amount is greater than a minimum value, which constitutes a resource leak, of the first storage resource amount, and the first preset increase rule is set as follows an increase trend change of the first storage resource amount in a resource period constitutes a resource leak, where the resource period is a life cycle in which the target resource occupies storage space, and the first judging module includes a first judging submodule or a second judging submodule, where the first judging submodule is configured to determine whether the first storage resource amount occupied by the target resource is greater than the first preset threshold, and when a determining result of the first judging submodule is yes, determine that a determining result of the first judging module is yes, and the second judging submodule is configured to determine whether the first storage resource amount occupied by the target resource satisfies the first preset increase rule in the resource period, and when a determining result of the second judging submodule is yes, determine that a determining result of the first judging module is yes.

With reference to the first possible implementation manner of the second aspect, in a third possible implementation manner of the first aspect, the second preset condition includes a second preset threshold or a second preset increase rule, the second preset threshold is set such that a proportion value of the first storage resource amount is greater than a minimum value, which constitutes a resource leak, of the proportion value that the target sub-resource accounts for in the first storage resource amount, and the second preset increase rule is set as follows an increase trend change of the proportion value that the target sub-resource accounts for in the first storage resource amount in a resource period constitutes a resource leak, where the resource period is a life cycle in which the target resource occupies storage space, and the second judging module includes a third judging submodule or a fourth judging submodule, where the third judging submodule is configured to determine whether the proportion value that the target sub-resource accounts for in the first storage resource amount is greater than the second preset threshold, and when a determining result of the third judging submodule is yes, determine that a determining result of the second judging module is yes, and the fourth judging submodule is configured to determine whether the proportion value that the target sub-resource accounts for in the first storage resource amount satisfies the second preset increase rule in the resource period, and when a determining result of the fourth judging submodule is yes, determine that a determining result of the second judging module is yes.

In a fourth possible implementation manner of the first aspect, the storage location of the target code includes at least two storage location units, each of the storage location units stores sub-code, the sub-code stored in the at least two storage location units constitutes the target code, and the apparatus further includes a third obtaining module configured to obtain a target sub-resource called when the sub-code stored in the storage location unit runs, where target sub-resources called when the sub-code stored in the at least two storage location units runs constitute the target resource, a third determining module configured to determine a proportion value that the target sub-resource, which is called when the sub-code stored in the storage location unit runs, accounts for in the first storage resource amount, and a third judging module configured to determine whether the proportion value satisfies a third preset condition, where the third preset condition is set as follows the proportion value that the target sub-resource, which is called when the sub-code stored in the storage location unit runs, accounts for in the first storage resource amount constitutes a resource leak, and a leak location unit determining module configured to when a determining result of the third judging module is yes, determine the storage location unit as a resource leak location unit.

With reference to the fourth possible implementation manner of the second aspect, in a fifth possible implementation manner of the first aspect, the third preset condition includes a third preset threshold or a third preset increase rule, the third preset threshold is set such that the proportion value that the target sub-resource accounts for in the first storage resource amount is greater than a minimum value, which constitutes a resource leak, of the proportion value that the target sub-resource accounts for in the first storage resource amount, and the third preset increase rule is set as follows an increase trend change of the proportion value that the target sub-resource accounts for in the first storage resource amount in a resource period constitutes a resource leak, where the resource period is a life cycle in which the target resource occupies storage space, and the third judging module includes a fifth judging submodule or a sixth judging submodule, where the fifth judging submodule is configured to determine whether the proportion value is greater than the third preset threshold, and when a determining result of the fifth judging submodule is yes, determine that a determining result of the third judging module is yes, and the sixth judging submodule is configured to determine whether the proportion value satisfies the third preset increase rule in the resource period, where the resource period is a period in which the first storage resource amount is occupied, and when a determining result of the sixth judging submodule is yes, determine that a determining result of the third judging module is yes.

A third aspect of the embodiments of the present disclosure provides a resource leak detection system, including a memory, a resource leak detection apparatus, and a display apparatus, where the memory is configured to store a resource leak detection program, the resource leak detection apparatus is configured to run the resource leak detection program stored in the memory, to perform the resource leak detection method according to any one of the first aspect, and the first possible implementation manner, the second possible implementation manner, the third possible implementation manner, and the fourth possible implementation manner of the first aspect, and the display apparatus is configured to display a resource leak detection result obtained by the resource leak detection apparatus.

In the embodiments of the present disclosure, a target resource called when target code of a program runs can be obtained, a first storage resource amount occupied by the target resource can be determined, and when it is determined that the first storage resource amount occupied by the target resource satisfies a first preset condition, a storage location of the target code can be determined as a resource leak location. In this way, the target code of the program can be tracked, and further, by means of detection, the storage location of the target code can be determined as the resource leak location. In the embodiments of the present disclosure, the target code of the program is tracked, where the target code is partial code in program code. It is unnecessary to track all code of the program, only the target resource called when the target code runs needs to be detected, and it is unnecessary to track all resource allocation and release, which has low performance overheads and does not affect normal service running. In this way, resource leak detection can be performed in an online environment in which a program actually runs, and resource leak detection efficiency is improved.

Further, leak detection can be performed not only at a test stage or a debug stage of a program but also in an online environment in which the program actually runs, therefore, a resource leak problem that occurs when the program officially runs can be detected. In the embodiments of the present disclosure, a resource leak location can be detected by tracking target code of a program such that resource leak detection precision can be improved, and resource leak detection can be performed in an online environment in which a program actually runs, which reduces a false negative rate.

BRIEF DESCRIPTION OF DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a resource leak detection method and apparatus. A resource leak detection apparatus in the embodiments of the present disclosure may include a terminal device that can run a program, such as a smartphone, a tablet computer, a computer, or a server, and further, the resource leak detection apparatus in the embodiments of the present disclosure may further include a client module, such as a resource detection client, in a terminal device.

The embodiments of the present disclosure provide a resource leak detection solution, which is applicable to resource leak detection in an operating system such as an ANDROID operating system or a Linux operating system, and is further applicable to resource leak detection in an application program such as office software or communications software, which is not specifically limited in the embodiments of the present disclosure. A program in the embodiments of the present disclosure may include an operating system such as an ANDROID operating system or a Linux operating system, may further include an application program installed in a terminal device, and may further include a process and the like that run in a terminal device, which is not specifically limited in the embodiments of the present disclosure. A description is provided below using specific embodiments.

Figure 1:
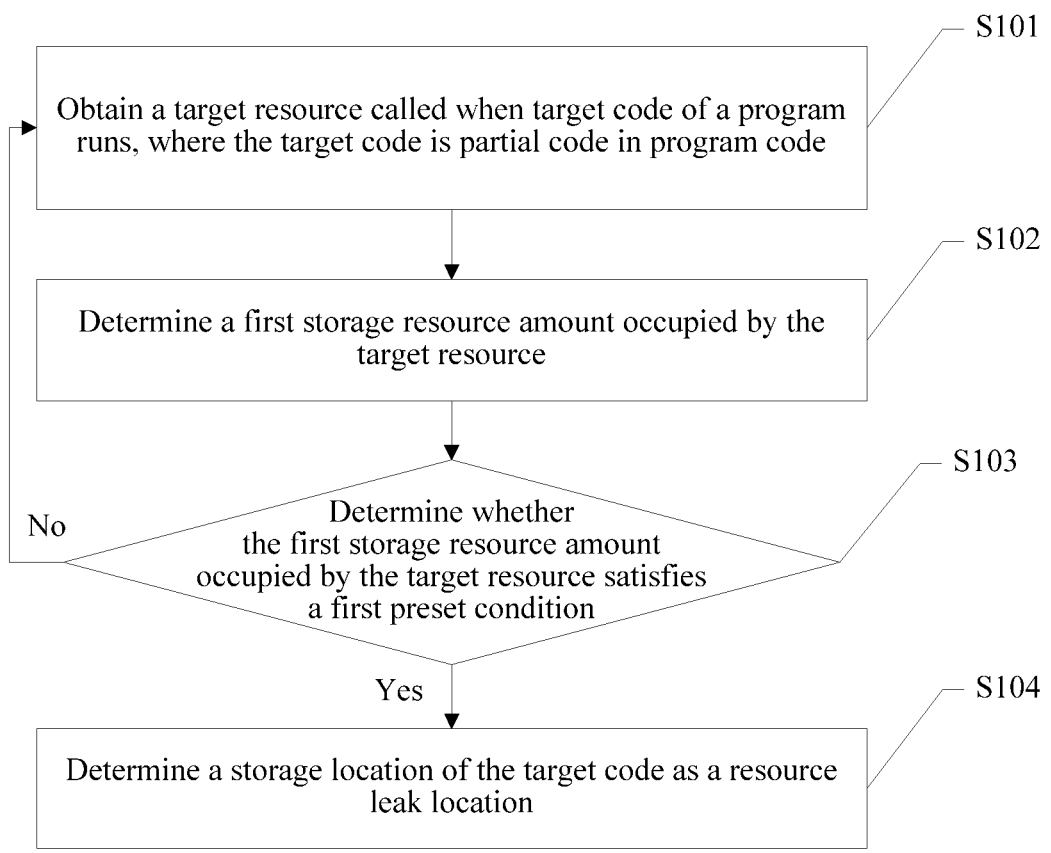
FIG. 1 is a schematic diagram of a resource leak detection method according to a first embodiment of the present disclosure.

FIG. 1 is a flowchart of a resource leak detection method according to a first embodiment of the present disclosure, and as shown in FIG. 1, a procedure in this embodiment includes the following steps.

S101. Obtain a target resource called when target code of a program runs, where the target code is partial code in program code.

In an optional implementation manner, a program in this embodiment of the present disclosure may include an operating system such as an ANDROID operating system or a Linux operating system, may further include an application program installed in a terminal device, and may further include a process and the like that run in a terminal device, which is not specifically limited in this embodiment of the present disclosure.

Further optionally, in this embodiment of the present disclosure, the target resource is called in a process in which the target code of the program runs, where the target resource is, for example, memory, a file handle, a semaphore, a message capsule, and a database connection pool, and after running of the target code of the program ends, the called target resource needs to be released in time. The target code is partial code in the program code, and the target code is code on which leak detection needs to be performed in this embodiment of the present disclosure.

Further, the program code may include multiple groups of target code, and the program code may be classified to obtain multiple groups of target code according to categories such as functional module and memory segment during development and design of the program code. For example, when the program is a process, the program code may be divided according to functions of the program code, to obtain different modules, where each module corresponds to a group of target code. Alternatively, the program code may also be divided according to sizes of memory blocks allocated to the program code, to obtain memory segments of different sizes, where each memory segment corresponds to a group of target code. When the program is slab memory of a Linux operating system, the program code may be divided according to different slab memory pools, to obtain multiple groups of target code.

Further, when the program code includes multiple groups of target code, a target resource called when each group of target code runs may be separately obtained, and a sum of target resources called when all the groups of target code run constitutes a resource called when the program code runs.

S102. Determine a first storage resource amount occupied by the target resource.

In an optional implementation manner, an initial value of the first storage resource amount occupied by the target resource may be set to 0, during resource allocation application, the first storage resource amount occupied by the target resource=the initial value+a quantity of allocated resources, and after resource release ends, the first storage resource amount occupied by the target resource=the initial value+the quantity of allocated resources−a quantity of released resources, therefore, the first storage resource amount occupied by the target resource may be determined using the initial value, the quantity of allocated resources, and the quantity of released resources. During specific implementation, the first storage resource amount occupied by the target resource may be a quantity of resources or a specific measurement, for example, a quantity of memory bytes.

S103. Determine whether the first storage resource amount occupied by the target resource satisfies a first preset condition, where the first preset condition is that the first storage resource amount occupied by the target resource complies with a resource leak condition.

If a determining result of S103 is yes, step S104 is performed. If a determining result of S103 is that the first storage resource amount occupied by the target resource does not satisfy the first preset condition, return to steps S101 to S103 to obtain again a target resource that needs to be called when another target code of the program runs.

In an optional implementation manner, the first storage resource amount occupied by the target resource includes but is not limited to an occupied memory amount, an occupied file handle amount, an occupied semaphore amount, an occupied message capsule amount, an occupied database connection pool amount, and the like, which is not specifically limited in this embodiment of the present disclosure.

Further, in this embodiment of the present disclosure, the first preset condition is set as follows the first storage resource amount occupied by the target resource constitutes a resource leak. Further, the first preset condition may include a first preset threshold or a first preset increase rule, the first preset threshold is set such that the first storage resource amount is greater than a minimum value, which constitutes a resource leak, of the first storage resource amount, and the first preset increase rule is set as follows an increase trend change of the first storage resource amount in a resource period constitutes a resource leak, where the resource period is a life cycle in which the target resource occupies storage space. Further, the determining whether the first storage resource amount occupied by the target resource satisfies a first preset condition in step S103 may specifically include determining whether the first storage resource amount occupied by the target resource is greater than the first preset threshold, and if the first storage resource amount occupied by the target resource is greater than the first preset threshold, determining that the first storage resource amount occupied by the target resource satisfies the first preset condition, or determining whether the first storage resource amount occupied by the target resource satisfies the first preset increase rule in the resource period, and if the first storage resource amount occupied by the target resource satisfies the first preset increase rule in the resource period, determining that the first storage resource amount occupied by the target resource satisfies the first preset condition.

During specific implementation, the first preset condition may include the first preset threshold or the first preset increase rule. The first preset threshold is set such that the first storage resource amount is greater than a minimum value, which constitutes a resource leak, of the first storage resource amount, and the first preset increase rule is set as follows an increase trend change of the first storage resource amount in the resource period constitutes a resource leak. Further, the resource period is a life cycle in which the target resource occupies storage space, and may specifically be an interval between a time when allocation of the target resource is applied for and a time when resource release ends.

In this embodiment of the present disclosure, whether the first storage resource amount occupied by the target resource satisfies the first preset increase rule in the resource period may be determined, and if the first storage resource amount occupied by the target resource satisfies the first preset increase rule in the resource period, it is determined that the first storage resource amount occupied by the target resource satisfies the first preset condition. For example, an increase change line graph may be drawn using the first storage resource amount occupied by the target resource in each resource period, and whether the first preset increase rule is satisfied may be determined using an increase change curve. During specific implementation, whether the first storage resource amount occupied by the target resource satisfies the first preset increase rule in the resource period may be determined using an algorithm such as a Mann-Kendall test method, linear regression, or a Sen slope estimation method. The Mann-Kendall test method, first proposed by Mann and further improved by Kendall, is an algorithm used to test a trend, linear regression is a statistical analysis method that uses regression analysis in statistics and that is based on a quantitative relationship between linear function modeling variants, and the Sen slope estimation method refers to a slope estimation algorithm proposed by Henri Theil and Pranab K. Sen.

S104. Determine a storage location of the target code as a resource leak location.

In an optional implementation manner, when a determining result in S103 is yes, that is, when it is determined that the first storage resource amount occupied by the target resource satisfies the first preset condition, the storage location of the target code is determined as the resource leak location. During specific implementation, the storage location of the target code may specifically include a file in which the target code is stored, and a line number of the target code.

Further optionally, when the program code includes multiple groups of target code, steps S101 to S103 may be simultaneously preformed for each group of target code, and if a determining result in S103 is yes, when a quantity (recorded as M) of groups of target code that satisfy the first preset condition is greater than a preset quantity (recorded as K, where K may be a preset maximum quantity of resource leak locations in a program), K storage locations of target code may be determined, from the multiple groups of target code that satisfy the first preset condition, as resource leak locations. For example, a preset quantity is 3, a quantity of groups of target code that satisfy the first preset condition is 5, where 5 is greater than 3, and five groups of target code that satisfy the first preset condition are respectively target code 1, target code 2, target code 3, target code 4, and target code 5. When the target code 1 runs, a target resource 1 is called, and a first storage resource amount occupied by the target resource 1 is a resource amount 1, when the target code 2 runs, a target resource 2 is called, and a first storage resource amount occupied by the target resource 2 is a resource amount 2, when the target code 3 runs, a target resource 3 is called, and a first storage resource amount occupied by the target resource 3 is a resource amount 3, when the target code 4 runs, a target resource 4 is called, and a first storage resource amount occupied by the target resource 4 is a resource amount 4, and when the target code 5 runs, a target resource 5 is called, and a first storage resource amount occupied by the target resource 5 is a resource amount 5. Values of the resource amount 1, the resource amount 2, the resource amount 3, the resource amount 4, and the resource amount 5 may be compared and sorted. If a comparison result is the resource amount 5>the resource amount 2>the resource amount 4>the resource amount 1>the resource amount 3, a preset quantity of relatively large resource amounts is the resource amount 5, the resource amount 2, and the resource amount 4, and storage locations of the target code 5, the target code 2, and the target code 4 that correspond to the resource amount 5, the resource amount 2, and the resource amount 4 may be separately determined as resource leak locations.

Further optionally, after step S103, the resource leak detection method provided in this embodiment of the present disclosure may further include outputting information about a resource leak detection result.

During specific implementation, the information about the resource leak detection result includes attribute information of the target code, the first storage resource amount occupied by the target resource, information about the resource leak location, information about a resource leak calling path, and information about a quantity of resources occupied by the resource leak calling path. The information about the resource leak detection result may be recorded during resource allocation. By outputting the information about the resource leak detection result, resource leak positioning precision can be improved, positioning workload can be reduced, and a requirement for skills of positioning personnel can be lowered. In addition, reproduction no longer needs to be performed in a laboratory, and resource leak positioning efficiency is improved.

In this embodiment of the present disclosure, a target resource called when target code of a program runs can be obtained, a first storage resource amount occupied by the target resource can be determined, and when it is determined that the first storage resource amount occupied by the target resource satisfies a first preset condition, a storage location of the target code can be determined as a resource leak location. In this way, the target code of the program can be tracked, and further, by means of detection, the storage location of the target code can be determined as the resource leak location. In this embodiment of the present disclosure, the target code of the program is tracked, where the target code is partial code in program code. It is unnecessary to track all code of the program, only the target resource called when the target code runs needs to be detected, and it is unnecessary to track all resource allocation and release, which has low performance overheads and does not affect normal service running. In this way, resource leak detection can be performed in an online environment in which a program actually runs, and resource leak detection efficiency is improved.

Further, leak detection can be performed not only at a test stage or a debug stage of a program but also in an online environment in which the program actually runs, therefore, a resource leak problem that occurs when the program officially runs can be detected. In this embodiment of the present disclosure, target code of a program can be tracked, and a resource leak location can be detected, thereby improving resource leak detection precision, and resource leak detection can be performed in an online environment in which a program actually runs, thereby reducing a false negative rate.

Figure 2:
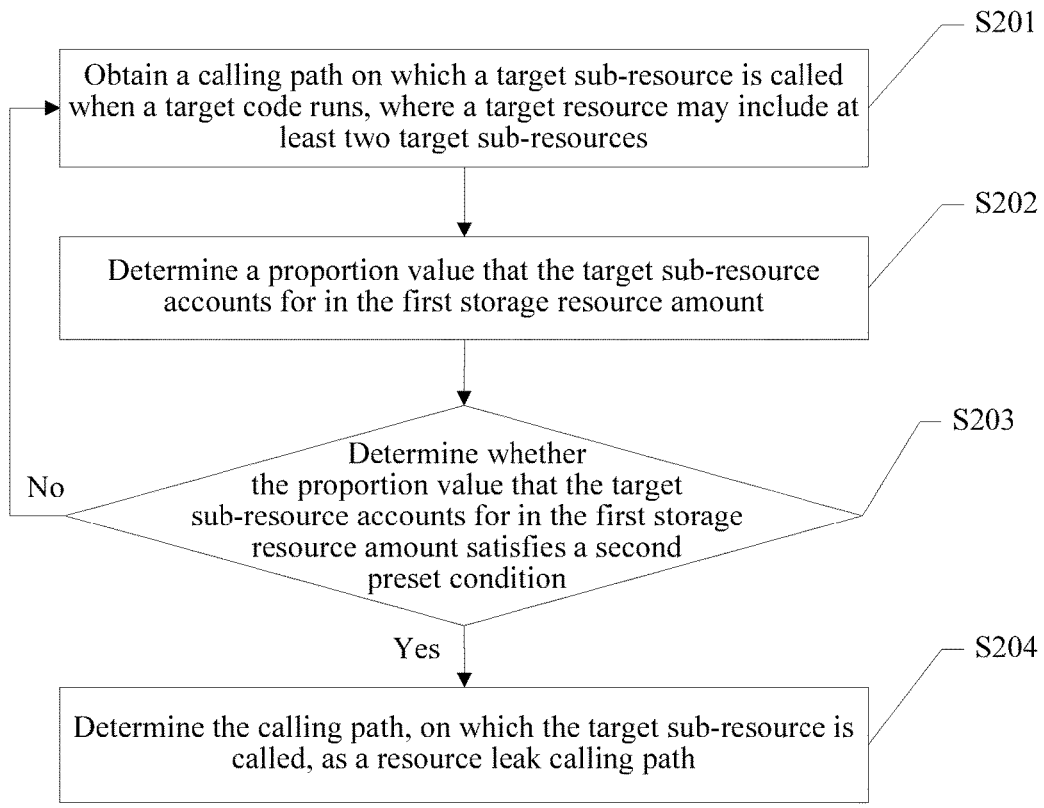
FIG. 2 is a schematic diagram of a resource leak detection method according to a second embodiment of the present disclosure.

FIG. 2 is a schematic diagram of a resource leak detection method according to a second embodiment of the present disclosure. As shown in FIG. 2, the method provided in this embodiment of the present disclosure may be implemented based on the method shown in FIG. 1, and specifically, steps S201 to S204 in this embodiment of the present disclosure may be performed after step S104 of the method shown in FIG. 1.

As shown in FIG. 2, the resource leak detection method provided in this embodiment of the present disclosure may further include steps S201 to S204.

S201. Obtain a calling path on which a target sub-resource is called when the target code runs, where the target resource may include at least two target sub-resources, and the target sub-resources are partial resources in the target resource called in a process of running the target code.

During specific implementation, the calling path may be expressed using a function call stack, and a calling path on which a target sub-resource is called when the target code runs is obtained, where a target resource may include at least two target sub-resources, and the target sub-resources are partial resources in the target resource called in a process of running the target code.

Further optionally, the calling path may be mapped according to a particular rule, to obtain a logical calling path. For example, for the resource leak location determined in S104, a quantity of layer types may be obtained by means of classification based on a quantity of layers of a function call stack for resource allocation, M logical calling paths are preset for each layer type, where the M logical calling paths are numbered 0, 1, 2, . . . , and M−1, a return address at a middle layer of the function call stack for resource allocation is obtained and is converted to an integer, a modulo operation is then performed using M, and an obtained result is used as a logical calling path number. In this case, the calling path on which the target sub-resource is called when the target code runs may be obtained.

S202. Determine a proportion value that the target sub-resource accounts for in the first storage resource amount.

During specific implementation, the proportion value that the target sub-resource accounts for in the first storage resource amount may be determined. For example, the first storage resource amount is a quantity of memory bytes 1000 kb, and the proportion value that the target sub-resource accounts for in the first storage resource amount is 200 kb.

S203. Determine whether the proportion value that the target sub-resource accounts for in the first storage resource amount satisfies a second preset condition, where the second preset condition is set as follows the proportion value that the target sub-resource accounts for in the first storage resource amount constitutes a resource leak. When a determining result in S203 is yes, perform step S204, or when a determining result in S203 is no, return to step S201 or return to step S101.

Further, the second preset condition is set as follows the proportion value that the target sub-resource accounts for in the first storage resource amount constitutes a resource leak, and the second preset condition may include a second preset threshold or a second preset increase rule. The second preset threshold is set such that a proportion value of the first storage resource amount is greater than a minimum value, which constitutes a resource leak, of the proportion value that the target sub-resource accounts for in the first storage resource amount, and the second preset increase rule is set as follows an increase trend change of the proportion value that the target sub-resource accounts for in the first storage resource amount in a resource period constitutes a resource leak, where the resource period is a life cycle in which the target resource occupies storage space. Specifically, the determining whether the proportion value that the target sub-resource accounts for in the first storage resource amount satisfies a second preset condition in step S203 may specifically include determining whether the proportion value that the target sub-resource accounts for in the first storage resource amount is greater than the second preset threshold, and if the proportion value that the target sub-resource accounts for in the first storage resource amount is greater than the second preset threshold, determining that the proportion value that the target sub-resource accounts for in the first storage resource amount satisfies the second preset condition, or determining whether the proportion value that the target sub-resource accounts for in the first storage resource amount satisfies the second preset increase rule in the resource period, and if the proportion value that the target sub-resource accounts for in the first storage resource amount satisfies the second preset increase rule in the resource period, determining that the proportion value that the target sub-resource accounts for in the first storage resource amount satisfies the second preset condition.

During specific implementation, the second preset condition may include the second preset threshold or the second preset increase rule. The second preset threshold is set such that a proportion value of the first storage resource amount is greater than a minimum value, which constitutes a resource leak, of the proportion value that the target sub-resource accounts for in the first storage resource amount, and the second preset increase rule is set as follows an increase trend change of the proportion value that the target sub-resource accounts for in the first storage resource amount in a resource period constitutes a resource leak, where the resource period is a life cycle in which the target resource occupies storage space, and may specifically be an interval between a time when allocation of the target resource is applied for and a time when resource release ends.

In this embodiment of the present disclosure, whether the proportion value that the target sub-resource accounts for in the first storage resource amount satisfies the second preset increase rule in the resource period may be determined, and if the proportion value that the target sub-resource accounts for in the first storage resource amount satisfies the second preset increase rule in the resource period, it is determined that the proportion value that the target sub-resource accounts for in the first storage resource amount satisfies the second preset condition. For example, an increase change line graph may be drawn using the proportion value that the target sub-resource accounts for in the first storage resource amount in each resource period, and whether the second preset increase rule is satisfied may be determined using an increase change curve. During specific implementation, whether the proportion value that the target sub-resource accounts for in the first storage resource amount satisfies the second preset increase rule in the resource period may be determined using an algorithm such as a Mann-Kendall test method, linear regression, or a Sen slope estimation method.

S204. Determine the calling path, on which the target sub-resource is called, as a resource leak calling path.

In an optional implementation manner, when a determining result of S203 is yes, that is, when it is determined that the proportion value that the target sub-resource accounts for in the first storage resource amount satisfies the second preset increase rule in the resource period, the calling path on which the target sub-resource is called is determined as the resource leak calling path.

By implementing this embodiment of the present disclosure, a calling path on which a target sub-resource is called when target code runs can be obtained, a proportion value that the target sub-resource accounts for in a first storage resource amount can be determined, and when it is determined that the proportion value that the target sub-resource accounts for in the first storage resource amount satisfies a second preset condition, the calling path on which the target sub-resource is called can be determined as a resource leak calling path. In this way, the calling path can be tracked, and further, by means of detection, the calling path can be determined as the resource leak calling path. In this way, a resource leak can be further positioned, which improves resource leak detection precision. Resource leak detection can be performed in an online environment in which a program actually runs, thereby reducing a false negative rate, and improving resource leak detection efficiency.

Figure 3:
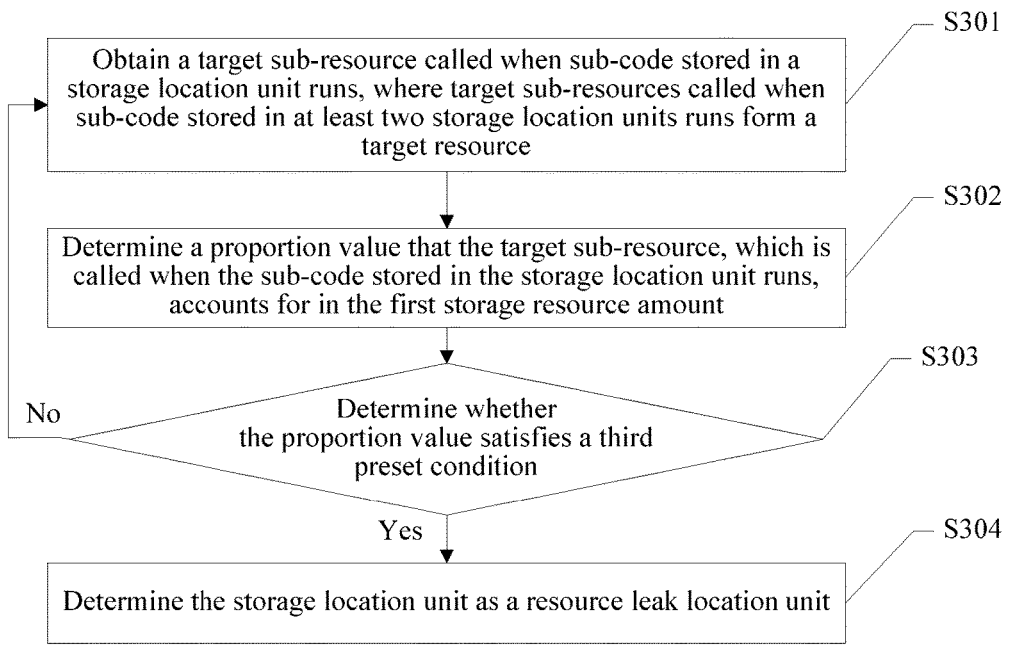
FIG. 3 is a schematic diagram of a resource leak detection method according to a third embodiment of the present disclosure.

FIG. 3 is a schematic diagram of a resource leak detection method according to a third embodiment of the present disclosure. As shown in FIG. 3, the method provided in this embodiment of the present disclosure may be implemented based on the method shown in FIG. 1, and specifically, steps S301 to S304 in this embodiment of the present disclosure may be performed after step S104 shown in FIG. 1. Further optionally, the method provided in this embodiment of the present disclosure and the second embodiment shown in FIG. 2 may also be simultaneously preformed, or the third embodiment shown in FIG. 3 is first preformed, and the second embodiment shown in FIG. 2 is then preformed. A specific implementation manner is not limited in this embodiment of the present disclosure.

As shown in FIG. 3, the resource leak detection method provided in this embodiment of the present disclosure may include steps S301 to S304. In this embodiment of the present disclosure, a storage location of the target code may include at least two storage location units, each storage location unit stores sub-code, and sub-code stored in the at least two storage location units constitutes the target code.

S301. Obtain a target sub-resource called when sub-code stored in a storage location unit runs, where target sub-resources called when sub-code stored in at least two storage location units runs constitute the target resource.

During specific implementation, the storage location of the target code may specifically include a file in which the target code is stored, and a line number of the target code. The target code may be classified according to the file or the line number, to obtain at least two storage location units. Further optionally, a storage location unit may be mapped according to a particular rule, to obtain a logical location. For example, N logical locations are preset for a piece of target code, where the N logical locations are numbered 0, 1, 2, ..., and N−1. A file name and a line number that represent a storage location of the target code are converted to integers, the integers are added (or another operation such as multiplying is preformed), a modulo operation is then preformed using N, and an obtained result is used as a logical location number, thereby determining a storage location unit. Further optionally, the storage location unit may further be divided with reference to another dimension such as an allocated resource size. For example, the storage location unit may be divided into a quantity of block types based on a quantity of bytes of an allocated memory block.

S302. Determine a proportion value that the target sub-resource, which is called when the sub-code stored in the storage location unit runs, accounts for in the first storage resource amount.

During specific implementation, the proportion value that the target sub-resource, which is called when the sub-code stored in the storage location unit runs, accounts for in the first storage resource amount may be determined. For example, the first storage resource amount is a quantity of memory bytes 1000 kb, and the proportion value that the target sub-resource, which is called when the sub-code stored in the storage location unit runs, accounts for in the first storage resource amount is 20 kb.

S303. Determine whether the proportion value satisfies a third preset condition, where the third preset condition is set as follows the proportion value that the target sub-resource, which is called when the sub-code stored in the storage location unit runs, accounts for in the first storage resource amount constitutes a resource leak.

When a determining result in S303 is yes, step S304 is performed, or when a determining result in S303 is no, return to step S301 or return to step S101.

Further, the third preset condition is set as follows the proportion value that the target sub-resource, which is called when the sub-code stored in the storage location unit runs, accounts for in the first storage resource amount constitutes a resource leak. The third preset condition may include a third preset threshold or a third preset increase rule. The third preset threshold is set such that the proportion value that the target sub-resource accounts for in the first storage resource amount is greater than a minimum value, which constitutes a resource leak, of the proportion value that the target sub-resource accounts for in the first storage resource amount, and the third preset increase rule is set as follows an increase trend change of the proportion value that the target sub-resource accounts for in the first storage resource amount in a resource period constitutes a resource leak, where the resource period is a life cycle in which the target resource occupies storage space. Further, the determining whether the proportion value satisfies a third preset condition in step S303 may specifically include determining whether the proportion value is greater than the third preset threshold, and if the proportion value is greater than the third preset threshold, determining that the proportion value satisfies the third preset condition, or determining whether the proportion value satisfies the third preset increase rule in the resource period, where the resource period is a period in which the first storage resource amount is occupied, and if the proportion value satisfies the third preset increase rule in the resource period, determining that the proportion value satisfies the third preset condition.

During specific implementation, the third preset condition may include the third preset threshold or the third preset increase rule. The third preset threshold is set such that the proportion value that the target sub-resource accounts for in the first storage resource amount is greater than a minimum value, which constitutes a resource leak, of the proportion value that the target sub-resource accounts for in the first storage resource amount, and the third preset increase rule is set as follows an increase trend change of the proportion value that the target sub-resource accounts for in the first storage resource amount in a resource period constitutes a resource leak, where the resource period is a life cycle in which the target resource occupies storage space. Further, the resource period is a period in which the first storage resource amount is occupied, and may specifically be an interval between a time when allocation of the target resource is applied for and a time when resource release ends.

In this embodiment of the present disclosure, whether the proportion value satisfies the third preset increase rule in the resource period may be determined, and if the proportion value satisfies the third preset increase rule in the resource period, it is determined that the proportion value satisfies the third preset condition. For example, an increase change line graph may be drawn using the proportion value in each resource period, and whether the third preset increase rule is satisfied may be determined using an increase change curve. During specific implementation, whether the proportion value satisfies the third preset increase rule in the resource period may be determined using an algorithm such as a Mann-Kendall test method, linear regression, or a Sen slope estimation method.

S304. Determine the storage location unit as a resource leak location unit.

In an optional implementation manner, when a determining result of S303 is yes, that is, when it is determined that the proportion value satisfies the third preset increase rule in the resource period, the storage location unit is determined as the resource leak location unit.

In implementation of this embodiment of the present disclosure, a storage location of target code may include at least two storage location units, a target sub-resource called when sub-code stored in a storage location unit runs may be obtained, a proportion value that the target sub-resource, which is called when the sub-code stored in the storage location unit runs, accounts for in the first storage resource amount is determined, and when it is determined that the proportion value satisfies a third preset condition, the storage location is determined as a resource leak location unit. In this way, the storage location unit in the storage location of the target code can be tracked, and further, by means of detection, the storage location unit can be determined as the resource leak location unit. In this way, a resource leak can be further positioned, which improves resource leak detection precision. Resource leak detection can be performed in an online environment in which a program actually runs, thereby reducing a false negative rate, and improving resource leak detection efficiency.

A resource leak detection apparatus provided in an embodiment of the present disclosure is described below in detail with reference to FIG. 4.

Figure 4:
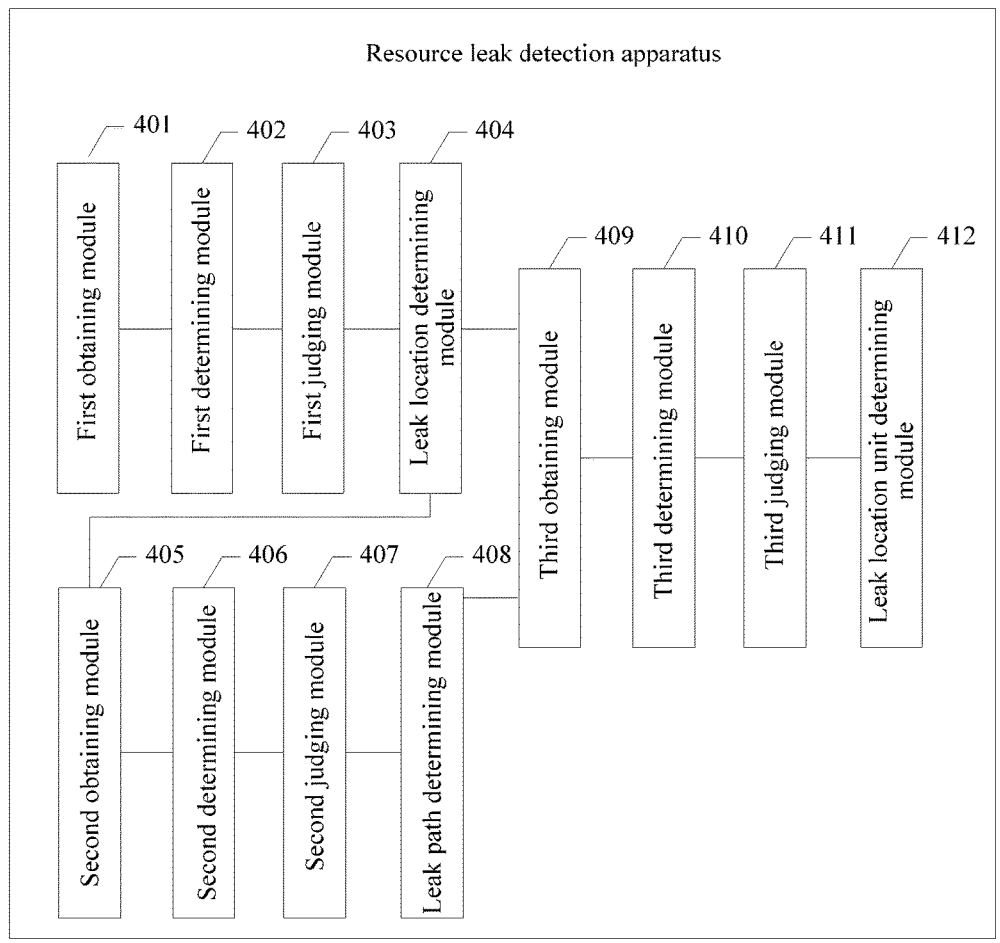
FIG. 4 is a schematic structural diagram of a resource leak detection apparatus according to an embodiment of the present disclosure.

It should be noted that the resource leak detection apparatus shown in FIG. 4 is configured to perform the method in any one of the embodiments shown in FIG. 1 to FIG. 3 of the present disclosure, and is an entity that executes the resource leak detection method based on any one of FIG. 1 to FIG. 3. For ease of description, only a part related to this embodiment of the present disclosure is shown, and for specific technical details that are not disclosed, refer to any one of the embodiments shown in FIG. 1 to FIG. 3 of the present disclosure. A resource leak detection apparatus in this embodiment of the present disclosure may include a terminal device that can run a program, such as a smartphone, a tablet computer, a computer, or a server.

FIG. 4 is a schematic structural diagram of a resource leak detection apparatus according to an embodiment of the present disclosure. The resource leak detection apparatus provided in this embodiment of the present disclosure may include a first obtaining module 401, a first determining module 402, a first judging module 403, and a leak location determining module 404.

The first obtaining module 401 is configured to obtain a target resource called when target code of a program runs, where the target code is partial code in program code.

In an optional implementation manner, a program in this embodiment of the present disclosure may include an operating system such as an ANDROID operating system or a Linux operating system, may further include an application program installed in a terminal device, and may further include a process and the like that run in a terminal device, which is not specifically limited in this embodiment of the present disclosure.

Further, optionally, in this embodiment of the present disclosure, the target resource is called in a process in which the target code of the program runs, where the target resource is, for example, memory, a file handle, a semaphore, a message capsule, and a database connection pool, and after running of the target code of the program ends, the called target resource needs to be released in time. The target code is partial code in the program code, and the target code is code on which leak detection needs to be performed in this embodiment of the present disclosure.

Further, the program code may include multiple groups of target code, and the program code may be classified to obtain multiple groups of target code according to categories such as functional module and memory segment during development and design of the program code. For example, when the program is a process, the program code may be divided according to functions of the program code, to obtain different modules, where each module corresponds to a group of target code. Alternatively, the program code may also be divided according to sizes of memory blocks allocated to the program code, to obtain memory segments of different sizes, where each memory segment corresponds to a group of target code. When the program is slab memory of a Linux operating system, the program code may be divided according to different slab memory pools, to obtain multiple groups of target code.

Further, when the program code includes multiple groups of target code, a target resource called when each group of target code runs may be separately obtained, and a sum of target resources called when all the groups of target code run constitutes a resource called when the program code runs.

The first determining module 402 is configured to determine a first storage resource amount occupied by the target resource.

In an optional implementation manner, an initial value of the first storage resource amount occupied by the target resource may be set to 0, during resource allocation application, the first storage resource amount occupied by the target resource=the initial value+a quantity of allocated resources, and after resource release ends, the first storage resource amount occupied by the target resource=the initial value+the quantity of allocated resources−a quantity of released resources. Therefore, the first determining module 402 may determine, using the initial value, the quantity of allocated resources, and the quantity of released resources, the first storage resource amount occupied by the target resource. During specific implementation, the first storage resource amount occupied by the target resource may be a quantity of resources or a specific measurement, for example, a quantity of memory bytes.

The first judging module 403 is configured to determine whether the first storage resource amount occupied by the target resource satisfies a first preset condition, where the first preset condition is that the first storage resource amount occupied by the target resource complies with a resource leak condition.

In an optional implementation manner, the first storage resource amount occupied by the target resource includes but is not limited to an occupied memory amount, an occupied file handle amount, an occupied semaphore amount, an occupied message capsule amount, an occupied database connection pool amount, and the like, which is not specifically limited in this embodiment of the present disclosure.

Further, the first preset condition is set as follows the first storage resource amount occupied by the target resource constitutes a resource leak. Further, the first preset condition includes a first preset threshold or a first preset increase rule, the first preset threshold is set such that the first storage resource amount is greater than a minimum value, which constitutes a resource leak, of the first storage resource amount, and the first preset increase rule is set as follows an increase trend change of the first storage resource amount in a resource period constitutes a resource leak, where the resource period is a life cycle in which the target resource occupies storage space. The first judging module 403 may include a first judging submodule or a second judging submodule.

The first judging submodule is configured to determine whether the first storage resource amount occupied by the target resource is greater than the first preset threshold, and when a determining result of the first judging submodule is yes, determine that a determining result of the first judging module 403 is yes.

The second judging submodule is configured to determine whether the first storage resource amount occupied by the target resource satisfies the first preset increase rule in the resource period, and when a determining result of the second judging submodule is yes, determine that a determining result of the first judging module 403 is yes.

During specific implementation, the first preset condition may include the first preset threshold or the first preset increase rule, the first preset threshold is set such that the first storage resource amount is greater than a minimum value, which constitutes a resource leak, of the first storage resource amount, and the first preset increase rule is set as follows an increase trend change of the first storage resource amount in the resource period constitutes a resource leak. Further, the resource period is a life cycle in which the target resource occupies storage space, and may specifically be an interval between a time when allocation of the target resource is applied for and a time when resource release ends.

In this embodiment of the present disclosure, the second judging submodule may determine whether the first storage resource amount occupied by the target resource satisfies the first preset increase rule in the resource period, and if the first storage resource amount occupied by the target resource satisfies the first preset increase rule in the resource period, determine that the first storage resource amount occupied by the target resource satisfies the first preset condition. For example, an increase change line graph may be drawn using the first storage resource amount occupied by the target resource in each resource period, and whether the first preset increase rule is satisfied may be determined using an increase change curve. During specific implementation, whether the first storage resource amount occupied by the target resource satisfies the first preset increase rule in the resource period may be determined using an algorithm such as a Mann-Kendall test method, linear regression, or a Sen slope estimation method. The Mann-Kendall test method, first proposed by Mann and further improved by Kendall, is an algorithm used to test a trend, linear regression is a statistical analysis method that uses regression analysis in statistics and that is based on a quantitative relationship between linear function modeling variants, and the Sen slope estimation method refers to a slope estimation algorithm proposed by Henri Theil and Pranab K. Sen.

The leak location determining module 404 is configured to when a determining result of the first judging module 403 is yes, determine a storage location of the target code as a resource leak location.

In an optional implementation manner, when a determining result of the first judging module 403 is yes, that is, when it is determined that the first storage resource amount occupied by the target resource satisfies the first preset condition, the storage location of the target code is determined as the resource leak location. During specific implementation, the storage location of the target code may specifically include a file in which the target code is stored, and a line number of the target code.

Further optionally, when the program code includes multiple groups of target code, if a quantity (recorded as M) of groups of target code that satisfy the first preset condition is greater than a preset quantity (recorded as K, where K may be a preset maximum quantity of resource leak locations in a program), K storage locations of target code may be determined, from the multiple groups of target code that satisfy the first preset condition, as resource leak locations. For example, a preset quantity is 3, a quantity of groups of target code that satisfy the first preset condition is 5, where 5 is greater than 3, and five groups of target code that satisfy the first preset condition are respectively target code 1, target code 2, target code 3, target code 4, and target code 5. When the target code 1 runs, a target resource 1 is called, and a first storage resource amount occupied by the target resource 1 is a resource amount 1, when the target code 2 runs, a target resource 2 is called, and a first storage resource amount occupied by the target resource 2 is a resource amount 2, when the target code 3 runs, a target resource 3 is called, and a first storage resource amount occupied by the target resource 3 is a resource amount 3, when the target code 4 runs, a target resource 4 is called, and a first storage resource amount occupied by the target resource 4 is a resource amount 4, and when the target code 5 runs, a target resource 5 is called, and a first storage resource amount occupied by the target resource 5 is a resource amount 5. Values of the resource amount 1, the resource amount 2, the resource amount 3, the resource amount 4, and the resource amount 5 may be compared and sorted. If a comparison result is the resource amount 5>the resource amount 2>the resource amount 4>the resource amount 1>the resource amount 3, a preset quantity of relatively large resource amounts is the resource amount 5, the resource amount 2, and the resource amount 4, and storage locations of the target code 5, the target code 2, and the target code 4 that correspond to the resource amount 5, the resource amount 2, and the resource amount 4 may be separately determined as resource leak locations.

Further optionally, the apparatus provided in this embodiment of the present disclosure may further include an output module.

The output module is configured to output information about a resource leak detection result.

During specific implementation, the information about the resource leak detection result includes attribute information of the target code, the first storage resource amount occupied by the target resource, information about the resource leak location, information about a resource leak calling path, and information about a quantity of resources occupied by the resource leak calling path. The information about the resource leak detection result may be recorded during resource allocation. By outputting the information about the resource leak detection result, resource leak positioning precision can be improved, positioning workload can be reduced, and a requirement for skills of positioning personnel can be lowered. In addition, reproduction no longer needs to be performed in a laboratory, and resource leak positioning efficiency is improved.

Further optionally, the resource leak detection apparatus provided in this embodiment of the present disclosure may further include a second obtaining module 405, a second determining module 406, a second judging module 407, and a leak path determining module 408.

The second obtaining module 405 is configured to obtain a calling path on which a target sub-resource is called when the target code runs, where a target resource includes at least two target sub-resources, and the target sub-resources are partial resources in the target resource called in a process of running the target code.

During specific implementation, the calling path may be expressed using a function call stack, and a calling path on which a target sub-resource is called when the target code runs is obtained, where a target resource may include at least two target sub-resources, and the target sub-resources are partial resources in the target resource called in a process of running the target code.

Further optionally, the calling path may be mapped according to a particular rule, to obtain a logical calling path. For example, for the resource leak location determined by the leak location determining module 404, a quantity of layer types may be obtained by means of classification based on a quantity of layers of a function call stack for resource allocation, M logical calling paths are preset for each layer type, where the M logical calling paths are numbered 0, 1, 2, . . . , and M−1, a return address at a middle layer of the function call stack for resource allocation is obtained and is converted to an integer, a modulo operation is then performed using M, and an obtained result is used as a logical calling path number. In this case, the calling path on which the target sub-resource is called when the target code runs may be obtained.

The second determining module 406 is configured to determine a proportion value that the target sub-resource accounts for in the first storage resource amount.

During specific implementation, the second determining module 406 may determine the proportion value that the target sub-resource accounts for in the first storage resource amount. For example, the first storage resource amount is a quantity of memory bytes 1000 kb, and the proportion value that the target sub-resource accounts for in the first storage resource amount is 200 kb.

The second judging module 407 is configured to determine whether the proportion value that the target sub-resource accounts for in the first storage resource amount satisfies a second preset condition, where the second preset condition is set as follows the proportion value that the target sub-resource accounts for in the first storage resource amount constitutes a resource leak.

In an optional implementation manner, the second preset condition is set as follows the proportion value that the target sub-resource accounts for in the first storage resource amount constitutes a resource leak. The second preset condition may include a second preset threshold or a second preset increase rule, the second preset threshold is set such that a proportion value of the first storage resource amount is greater than a minimum value, which constitutes a resource leak, of the proportion value that the target sub-resource accounts for in the first storage resource amount, and the second preset increase rule is set as follows an increase trend change of the proportion value that the target sub-resource accounts for in the first storage resource amount in a resource period constitutes a resource leak, where the resource period is a life cycle in which the target resource occupies storage space. Further, the second judging module 407 may include a third judging submodule or a fourth judging submodule.

The third judging submodule is configured to determine whether the proportion value that the target sub-resource accounts for in the first storage resource amount is greater than the second preset threshold, and when a determining result of the third judging submodule is yes, determine that a determining result of the second judging module 407 is yes.

The fourth judging submodule is configured to determine whether the proportion value that the target sub-resource accounts for in the first storage resource amount satisfies the second preset increase rule in the resource period, and when a determining result of the fourth judging submodule is yes, determine that a determining result of the second judging module 407 is yes.

During specific implementation, the second preset condition may include a second preset threshold or a second preset increase rule. The second preset threshold is set such that a proportion value of the first storage resource amount is greater than a minimum value, which constitutes a resource leak, of the proportion value that the target sub-resource accounts for in the first storage resource amount, and the second preset increase rule is set as follows an increase trend change of the proportion value that the target sub-resource accounts for in the first storage resource amount in a resource period constitutes a resource leak, where the resource period is a life cycle in which the target resource occupies storage space, and may specifically be an interval between a time when allocation of the target resource is applied for and a time when resource release ends.

In this embodiment of the present disclosure, the fourth judging submodule may determine whether the proportion value that the target sub-resource accounts for in the first storage resource amount satisfies the second preset increase rule in the resource period, and if the proportion value that the target sub-resource accounts for in the first storage resource amount satisfies the second preset increase rule in the resource period, determine that the proportion value that the target sub-resource accounts for in the first storage resource amount satisfies the second preset condition. For example, an increase change line graph may be drawn using the proportion value that the target sub-resource accounts for in the first storage resource amount in each resource period, and whether the second preset increase rule is satisfied may be determined using an increase change curve. During specific implementation, whether the proportion value that the target sub-resource accounts for in the first storage resource amount satisfies the second preset increase rule in the resource period may be determined using an algorithm such as a Mann-Kendall test method, linear regression, or a Sen slope estimation method.

The leak path determining module 408 is configured to when a determining result of the second judging module 407 is yes, determine the calling path, on which the target sub-resource is called, as a resource leak calling path.

In an optional implementation manner, when a determining result of the second judging module 407 is yes, that is, when it is determined that the proportion value that the target sub-resource accounts for in the first storage resource amount satisfies the second preset increase rule in the resource period, the leak path determining module 408 determines the calling path, on which the target sub-resource is called, as the resource leak calling path.

Further optionally, the resource leak detection apparatus provided in this embodiment of the present disclosure may further include a third obtaining module 409, a third determining module 410, a third judging module 411, and a leak location unit determining module 412.

The storage location of the target code includes least two storage location units, each storage location unit stores sub-code, and sub-code stored in the at least two storage location units constitutes the target code.

The third obtaining module 409 is configured to obtain a target sub-resource called when the sub-code stored in the storage location unit runs, where target sub-resources called when the sub-code stored in the at least two storage location units runs constitute the target resource.

During specific implementation, the storage location of the target code may specifically include a file in which the target code is stored, and a line number of the target code. The target code may be classified according to the file or the line number, to obtain at least two storage location units. Further optionally, a storage location unit may be mapped according to a particular rule, to obtain a logical location. For example, N logical locations are preset for a piece of target code, where the N logical locations are numbered 0, 1, 2, . . . , and N−1. A file name and a line number that represent a storage location of the target code are converted to integers, the integers are added (or another operation such as multiplying is performed), a modulo operation is then performed using N, and an obtained result is used as a logical location number, thereby determining a storage location unit. Further optionally, the storage location unit may further be divided with reference to another dimension such as an allocated resource size. For example, the storage location unit may be divided into a quantity of block types based on a quantity of bytes of an allocated memory block.

The third determining module 410 is configured to determine a proportion value that the target sub-resource, which is called when the sub-code stored in the storage location unit runs, accounts for in the first storage resource amount.

During specific implementation, the third determining module 410 may determine the proportion value that the target sub-resource, which is called when the sub-code stored in the storage location unit runs, accounts for in the first storage resource amount. For example, the first storage resource amount is a quantity of memory bytes 1000 kb, and the proportion value that the target sub-resource, which is called when the sub-code stored in the storage location unit runs, accounts for in the first storage resource amount is 20 kb.

The third judging module 411 is configured to determine whether the proportion value satisfies a third preset condition, where the third preset condition is set as follows the proportion value that the target sub-resource, which is called when the sub-code stored in the storage location unit runs, accounts for in the first storage resource amount constitutes a resource leak.

In an optional implementation manner, the third preset condition is set as follows the proportion value that the target sub-resource, which is called when the sub-code stored in the storage location unit runs, accounts for in the first storage resource amount constitutes a resource leak. Further, the third preset condition includes a third preset threshold or a third preset increase rule, the third preset threshold is set such that the proportion value that the target sub-resource accounts for in the first storage resource amount is greater than a minimum value, which constitutes a resource leak, of the proportion value that the target sub-resource accounts for in the first storage resource amount, and the third preset increase rule is set as follows an increase trend change of the proportion value that the target sub-resource accounts for in the first storage resource amount in a resource period constitutes a resource leak, where the resource period is a life cycle in which the target resource occupies storage space. The third judging module 411 may include a fifth judging submodule or a sixth judging submodule.

The fifth judging submodule is configured to determine whether the proportion value is greater than the third preset threshold, and when a determining result of the fifth judging submodule is yes, determine that a determining result of the third judging module 411 is yes.

The sixth judging submodule is configured to determine whether the proportion value satisfies the third preset increase rule in the resource period, where the resource period is a period in which the first storage resource amount is occupied, and when a determining result of the sixth judging submodule is yes, determine that a determining result of the third judging module 411 is yes.

During specific implementation, the third preset condition may include the third preset threshold or the third preset increase rule, the third preset threshold is set such that the proportion value that the target sub-resource accounts for in the first storage resource amount is greater than a minimum value, which constitutes a resource leak, of the proportion value that the target sub-resource accounts for in the first storage resource amount, and the third preset increase rule is set as follows an increase trend change of the proportion value that the target sub-resource accounts for in the first storage resource amount in a resource period constitutes a resource leak, where the resource period is a life cycle in which the target resource occupies storage space, and may specifically be an interval between a time when allocation of the target resource is applied for and a time when resource release ends.

In this embodiment of the present disclosure, the sixth judging submodule may determine whether the proportion value satisfies the third preset increase rule in the resource period, and if the proportion value satisfies the third preset increase rule in the resource period, determine that the proportion value satisfies the third preset condition. For example, an increase change line graph may be drawn using the proportion value in each resource period, and whether the third preset increase rule is satisfied may be determined using an increase change curve. During specific implementation, whether the proportion value satisfies the third preset increase rule in the resource period may be determined using an algorithm such as a Mann-Kendall test method, linear regression, or a Sen slope estimation method.

The leak location unit determining module 412 is configured to when a determining result of the third judging module 411 is yes, determine the storage location unit as a resource leak location unit.

In an optional implementation manner, when a determining result of the third judging module 411 is yes, that is, when it is determined that the proportion value satisfies the third preset increase rule in the resource period, the leak location unit determining module 412 may determine the storage location unit as the resource leak location unit.

By implementing this embodiment of the present disclosure, a target resource called when target code of a program runs can be obtained, a first storage resource amount occupied by the target resource can be determined, and when it is determined that the first storage resource amount occupied by the target resource satisfies a first preset condition, a storage location of the target code can be determined as a resource leak location. In this embodiment of the present disclosure, the target code of the program is tracked, where the target code is partial code in program code. It is unnecessary to track all code of the program, only the target resource called when the target code runs needs to be detected, and it is unnecessary to track all resource allocation and release, which has low performance overheads and does not affect normal service running. In this way, resource leak detection can be performed in an online environment in which a program actually runs, overheads are reduced, and resource leak detection efficiency is improved.

Further, leak detection can be performed not only at a test stage or a debug stage of a program but also in an online environment in which the program actually runs, therefore, a resource leak problem that occurs when the program officially runs can be detected. In this embodiment of the present disclosure, target code of a program can be tracked, and a resource leak location can be detected, thereby improving resource leak detection precision, and resource leak detection can be performed in an online environment in which a program actually runs, thereby reducing a false negative rate, and improving resource leak detection efficiency.

Further, a calling path on which a target sub-resource is called when target code runs can be obtained, a proportion value that the target sub-resource accounts for in a first storage resource amount can be determined, and when it is determined that the proportion value that the target sub-resource accounts for in the first storage resource amount satisfies a second preset condition, the calling path on which the target sub-resource is called can be determined as a resource leak calling path. In this way, the calling path can be tracked, and further, by means of detection, the calling path can be determined as the resource leak calling path. In this way, a resource leak can be further positioned, which improves resource leak detection precision.

Further, the storage location of target code may include at least two storage location units, a target sub-resource called when sub-code stored in a storage location unit runs may be obtained, a proportion value that the target sub-resource, which is called when the sub-code stored in the storage location unit runs, accounts for in the first storage resource amount is determined, and when it is determined that the proportion value satisfies a third preset condition, the storage location is determined as a resource leak location unit. In this way, the storage location unit in the storage location of the target code can be tracked, and further, by means of detection, the storage location unit can be determined as the resource leak location unit. In this way, a resource leak can be further positioned, which improves resource leak detection precision.

It should be noted that the first obtaining module, the first determining module, the first judging module, and the leak location determining module may be independently disposed processors, may be implemented by being integrated into a processor of a detection terminal, or may be stored in a memory of a detection terminal in a constitute of program code. The second obtaining module, the second determining module, the second judging module, and the leak path determining module are implemented in a same manner as a data collection module, and are not repeatedly described herein. The third obtaining module, the third determining module, the third judging module, and the leak location unit determining module are implemented in a same manner as a data collection module, and are not repeatedly described herein. A processor of a detection terminal calls and executes functions of the foregoing modules. The processor may be a central processing unit (CPU), or an application-specific integrated circuit (ASIC), or one or more integrated circuits configured to implement the embodiments of the present disclosure.

Figure 5:
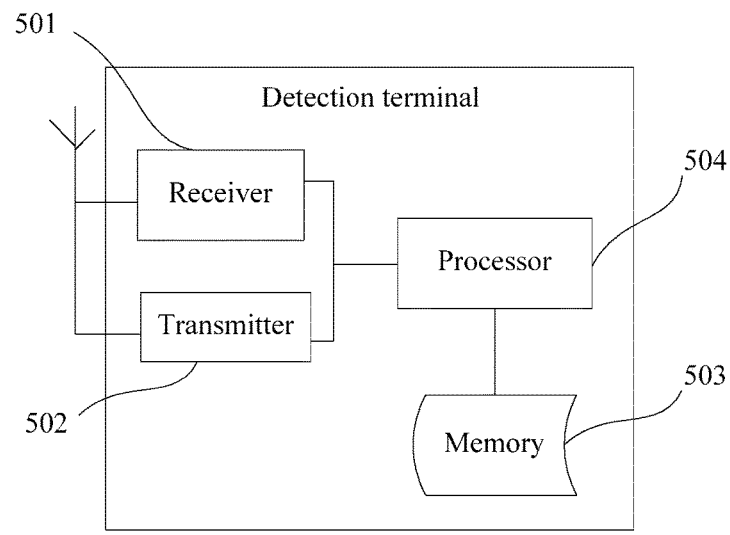
FIG. 5 is a schematic structural diagram of a detection terminal according to an embodiment of the present disclosure.

FIG. 5 is a schematic structural diagram of a detection terminal according to an embodiment of the present disclosure. The detection terminal provided in this embodiment corresponds to the method shown in any one of FIG. 1 to FIG. 3, and is an entity that executes the resource leak detection method shown in any one of FIG. 1 to FIG. 3. A specific implementation constitute is shown in FIG. 5. The detection terminal in this embodiment of the present disclosure includes a receiver 501, a transmitter 502, a memory 503, and a processor 504, where the receiver 501, the transmitter 502, and the memory 503 are all connected to the processor 504. For example, the receiver 501, the transmitter 502, and the memory 503 may be connected to the processor 504 using a bus. Certainly, the detection terminal may further include a general-purpose component such as an antenna, a baseband processing component, an intermediate-radio frequency processing component, or an input-output apparatus, which is not specifically limited in this embodiment of the present disclosure.

The receiver 501 and the transmitter 502 may be integrated together to constitute a transceiver.

The memory 503 is configured to store executable program code, where the program code includes a computer operation instruction. The memory 403 may include a high-speed RAM memory, and may further include a non-volatile memory, such as at least one magnetic disk memory.

The processor 504 may be a CPU or an ASIC, or is configured as one or more integrated circuits that implement the embodiment of the present disclosure.

The memory 503 stores a group of program code, and the processor 504 is configured to call the program code stored in the memory 503 to perform the following operations obtaining a target resource called when target code of a program runs, where the target code is partial code in program code, determining a first storage resource amount occupied by the target resource, determining whether the first storage resource amount occupied by the target resource satisfies a first preset condition, where the first preset condition is set as follows the first storage resource amount occupied by the target resource constitutes a resource leak. And if the first storage resource amount occupied by the target resource satisfies the first preset condition, determining a storage location of the target code as a resource leak location.

In an optional implementation manner, the target resource includes at least two target sub-resources, the target sub-resources are some resources in the target resource called in a process of running the target code, and the processor 504 is further configured to obtaining a calling path on which a target sub-resource is called when the target code runs, determining a proportion value that the target sub-resource accounts for in the first storage resource amount, determining whether the proportion value that the target sub-resource accounts for in the first storage resource amount satisfies a second preset condition, where the second preset condition is set as follows the proportion value that the target sub-resource accounts for in the first storage resource amount constitutes a resource leak and if the proportion value that the target sub-resource accounts for in the first storage resource amount satisfies the second preset condition, determining the calling path, on which the target sub-resource is called, as a resource leak calling path.

In an optional implementation manner, the first preset condition includes a first preset threshold or a first preset increase rule, the first preset threshold is set such that the first storage resource amount is greater than a minimum value, which constitutes a resource leak, of the first storage resource amount, and the first preset increase rule is set as follows an increase trend change of the first storage resource amount in a resource period constitutes a resource leak, where the resource period is a life cycle in which the target resource occupies storage space, and the resource period is a life cycle in which the target resource occupies storage space. The determining, by the processor 504, whether the first storage resource amount occupied by the target resource satisfies a first preset condition includes determining whether the first storage resource amount occupied by the target resource is greater than the first preset threshold, and if the first storage resource amount occupied by the target resource is greater than the first preset threshold, determining that the first storage resource amount occupied by the target resource satisfies the first preset condition, or determining whether the first storage resource amount occupied by the target resource satisfies the first preset increase rule in the resource period, and if the first storage resource amount occupied by the target resource satisfies the first preset increase rule in the resource period, determining that the first storage resource amount occupied by the target resource satisfies the first preset condition.

In an optional implementation manner, the second preset condition includes a second preset threshold or a second preset increase rule, the second preset threshold is set such that a proportion value of the first storage resource amount is greater than a minimum value, which constitutes a resource leak, of the proportion value that the target sub-resource accounts for in the first storage resource amount, and the second preset increase rule is set as follows an increase trend change of the proportion value that the target sub-resource accounts for in the first storage resource amount in a resource period constitutes a resource leak, where the resource period is a life cycle in which the target resource occupies storage space, and the resource period is a life cycle in which the target resource occupies storage space. The determining, by the processor 504, whether the proportion value that the target sub-resource accounts for in the first storage resource amount satisfies a second preset condition includes determining whether the proportion value that the tar get sub-resource accounts for in the first storage resource amount is greater than the second preset threshold, and if the proportion value that the target sub-resource accounts for in the first storage resource amount is greater than the second preset threshold, determining that the proportion value that the target sub-resource accounts for in the first storage resource amount satisfies the second preset condition, or determining whether the proportion value that the target sub-resource accounts for in the first storage resource amount satisfies the second preset increase rule in the resource period, and if the proportion value that the target sub-resource accounts for in the first storage resource amount satisfies the second preset increase rule in the resource period, determining that the proportion value that the target sub-resource accounts for in the first storage resource amount satisfies the second preset condition.

In an optional implementation manner, the storage location of the target code includes at least two storage location units, each storage location unit stores sub-code, sub-code stored in the at least two storage location units constitutes the target code, and the processor 504 is further configured to obtaining a target sub-resource called when the sub-code stored in the storage location unit runs, where target sub-resources called when the sub-code stored in the at least two storage location units runs constitute the target resource, determining a proportion value that the target sub-resource, which is called when the sub-code stored in the storage location unit runs, accounts for in the first storage resource amount, determining whether the proportion value satisfies a third preset condition, where the third preset condition is set as follows the proportion value that the target sub-resource, which is called when the sub-code stored in the storage location unit runs, accounts for in the first storage resource amount constitutes a resource leak and if the proportion value satisfies the third preset condition, determining the storage location unit as a resource leak location unit.

In an optional implementation manner, the third preset condition includes a third preset threshold or a third preset increase rule, the third preset threshold is set such that the proportion value that the target sub-resource accounts for in the first storage resource amount is greater than a minimum value, which constitutes a resource leak, of the proportion value that the target sub-resource accounts for in the first storage resource amount, and the third preset increase rule is set as follows an increase trend change of the proportion value that the target sub-resource accounts for in the first storage resource amount in a resource period constitutes a resource leak, where the resource period is a life cycle in which the target resource occupies storage space. The determining, by the processor 504, whether the proportion value satisfies the third preset condition includes determining whether the proportion value is greater than the third preset threshold, and if the proportion value is greater than the third preset threshold, determining that the proportion value satisfies the third preset condition, or determining whether the proportion value satisfies the third preset increase rule in the resource period, and if the proportion value satisfies the third preset increase rule in the resource period, determining that the proportion value satisfies the third preset condition.

In the foregoing technical solution, a detection terminal is provided, including a receiver, a transmitter, a memory, and a processor, where the processor may obtain a target resource called when target code of a program runs, determine a first storage resource amount occupied by the target resource, and may determine a storage location of the target code as a resource leak location when it is determined that the first storage resource amount occupied by the target resource satisfies a first preset condition. In this way, the target code of the program can be tracked, and further, by means of detection, the storage location of the target code can be determined as the resource leak location. It is unnecessary to track all resource allocation and release, thereby reducing performance overheads.

Further, leak detection can be performed not only at a test stage or a debug stage of a program but also in an online environment in which the program actually runs, therefore, a resource leak problem that occurs when the program officially runs can be detected. In this embodiment of the present disclosure, target code of a program can be tracked, and a resource leak location can be detected, thereby improving resource leak detection precision, and resource leak detection can be performed in an online environment in which a program actually runs, thereby reducing a false negative rate, and improving resource leak detection efficiency.

Figure 6:
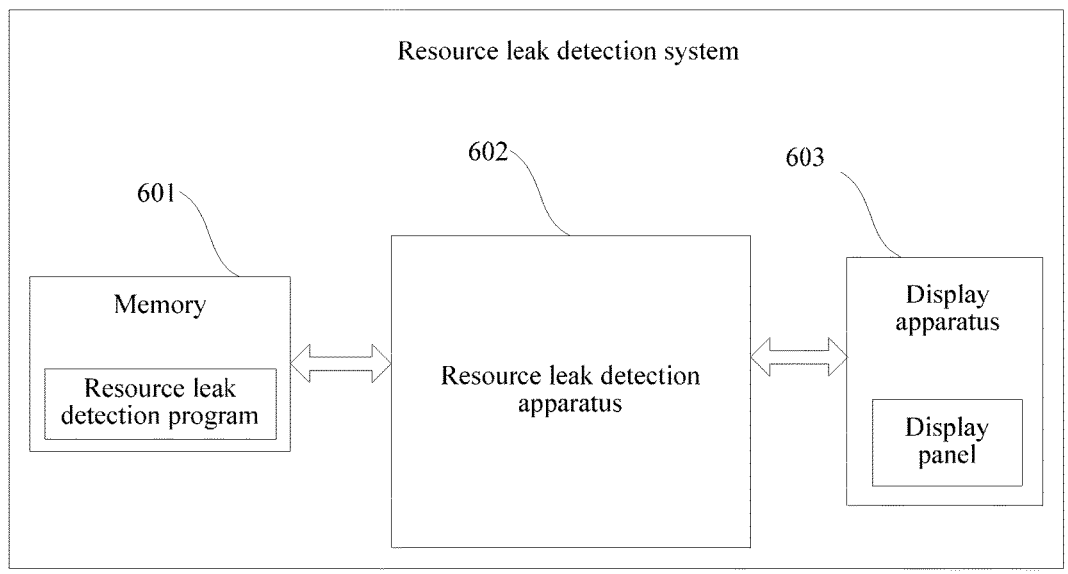
FIG. 6 is a schematic structural diagram of a resource leak detection system according to an embodiment of the present disclosure.

FIG. 6 is a schematic structural diagram of a resource leak detection system according to an embodiment of the present disclosure. As shown in the figure, the resource leak detection system further provided in this embodiment of the present disclosure may include a memory 601, a resource leak detection apparatus 602, and a display apparatus 603. The memory 601 is configured to store a resource leak detection program. The resource leak detection apparatus 602 is configured to run the resource leak detection program stored in the memory 601, to perform the resource leak detection method shown in any one of FIG. 1 to FIG. 3. The display apparatus 603 is configured to display a resource leak detection result obtained by the resource leak detection apparatus. Further, the display apparatus 603 may include a display panel. For example, a display panel may be configured in a constitute such as a liquid crystal display (LCD) or an organic light-emitting diode (OLED). Further, the resource leak detection result obtained by the resource leak detection apparatus and displayed by the display apparatus 603 may include the resource leak location, the resource leak calling path, the resource leak location unit, and the like. For a structure and a function of the resource leak detection apparatus 602, reference may be made to the related description in the embodiment shown in FIG. 4, and details are not described herein again. It should be noted that the apparatus provided in this embodiment corresponds to the resource leak detection method shown in any one of FIG. 1 to FIG. 3.

In the several embodiments provided in the present application, it should be understood that the disclosed apparatus and method may be implemented in other manners. For example, the described apparatus embodiment is merely exemplary. For example, the module or unit division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented using some interfaces. The indirect couplings or communication connections between the apparatuses, modules, or units may be implemented in electronic, mechanical, or other constitutes.

The modules or units described as separate parts may or may not be physically separate, and parts displayed as modules or units may or may not be physical modules or units, may be located in one position, or may be distributed on a plurality of network modules or units. A part or all of the modules or units may be selected according to actual needs to achieve the objectives of the solutions of the embodiments of the present application.

In addition, functional modules or units in the embodiments of the present application may be integrated into one processing module or unit, or each of the modules or units may exist alone physically, or two or more modules or units are integrated into one module or unit. The integrated modules or units may be implemented in a constitute of hardware, or may be implemented in a constitute of a software functional unit.

When the integrated module or unit is implemented in the constitute of a software functional module or unit and sold or used as an independent product, the integrated module or unit may be stored in a computer-readable storage medium. Based on such an understanding, the technical solutions of the present application essentially, or the part contributing to the prior art, or all or some of the technical solutions may be implemented in the constitute of a software product. The computer software product is stored in a storage medium and includes several instructions for instructing a computer device (which may be a personal computer, a server, or a network device) to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A resource leak detection method, comprising:
obtaining a target resource called in response to a target code of a program running, wherein the target code is partial code in a program code;
determining a first storage resource amount occupied by the target resource;
determining whether the first storage resource amount occupied by the target resource satisfies a first preset condition, wherein the first preset condition is set such that the first storage resource amount occupied by the target resource constitutes a resource leak;
determining a storage location of the target code as a resource leak location in response to the first storage resource amount occupied by the target resource satisfying the first preset condition, wherein the target resource comprises at least two target sub-resources, wherein the target sub-resources are partial resources that are called in a process of running the target code and that are in the target resource;

obtaining a calling path on which a target sub-resource of the at least two target sub-resources is called in response to the target code running;

determining a proportion value that the target sub-resource accounts for in the first storage resource amount;

determining whether the proportion value that the target sub-resource accounts for in the first storage resource amount satisfies a second preset condition, wherein the second preset condition is set such that the proportion value that the target sub-resource accounts for in the first storage resource amount constitutes a resource leak; and determining the calling path on which the target sub-resource is called as a resource leak calling path in response to the proportion value that the target sub-resource accounts for in the first storage resource amount satisfying the second preset condition.

2. The method according to claim 1, wherein the second preset condition comprises a second preset threshold or a second preset increase rule, wherein the second preset threshold is set such that a proportion value of the first storage resource amount is greater than a minimum value of the proportion value that the target sub-resource accounts for in the first storage resource amount, which constitutes a resource leak, wherein the second preset increase rule is set such that an increase trend change of the proportion value that the target sub-resource accounts for in the first storage resource amount in a resource period constitutes a resource leak, wherein the resource period is a life cycle in which the target resource occupies storage space, and wherein determining whether the proportion value that the target sub-resource accounts for in the first storage resource amount satisfies a second preset condition comprises:

determining whether the proportion value that the target sub-resource accounts for in the first storage resource amount is greater than the second preset threshold; and determining that the proportion value that the target sub-resource accounts for in the first storage resource amount satisfies the second preset condition in response to the proportion value that the target sub-resource accounts for in the first storage resource amount being greater than the second preset threshold.

3. The method according to claim 1, wherein the second preset condition comprises a second preset threshold or a second preset increase rule, wherein the second preset threshold is set such that a proportion value of the first storage resource amount is greater than a minimum value of the proportion value that the target sub-resource accounts for in the first storage resource amount, which constitutes a resource leak, wherein the second preset increase rule is set such that an increase trend change of the proportion value that the target sub-resource accounts for in the first storage resource amount in a resource period constitutes a resource leak, wherein the resource period is a life cycle in which the target resource occupies storage space, and wherein determining whether the proportion value that the target sub-resource accounts for in the first storage resource amount satisfies a second preset condition comprises:

determining whether the proportion value that the target sub-resource accounts for in the first storage resource amount satisfies the second preset increase rule in the resource period; and determining that the proportion value that the target sub-resource accounts for in the first storage resource amount satisfies the second preset condition in response to the proportion value that the target sub-resource accounts for in the first storage resource amount satisfying the second preset increase rule in the resource period.

4. A resource leak detection method, comprising:

obtaining a target resource called in response to a target code of a program running, wherein the target code is partial code in a program code;

determining a first storage resource amount occupied by the target resource;

determining whether the first storage resource amount occupied by the target resource satisfies a first preset condition, wherein the first preset condition is set such that the first storage resource amount occupied by the target resource constitutes a resource leak; and determining a storage location of the target code as a resource leak location in response to the first storage resource amount occupied by the target resource satisfying the first preset condition, wherein the storage location of the target code comprises at least two storage location units, wherein each of the storage location units stores a sub-code, wherein the sub-code stored in the at least two storage location units constitutes the target code;

obtaining a target sub-resource called in response to the sub-code stored in the storage location unit running, wherein target sub-resources called in response to the sub-code stored in the at least two storage location units running constitute the target resource;

determining a proportion value that the target sub-resource accounts for in the first storage resource amount, wherein the target sub-resource is called in response to the sub-code stored in the storage location unit running;

determining whether the proportion value satisfies a third preset condition, wherein the third preset condition is set such that the proportion value that the target sub-resource accounts for the first storage resource amount constitutes a resource leak; and determining the storage location unit as a resource leak location unit in response to the proportion value satisfying the third preset condition.

5. The method according to claim 4, wherein the third preset condition comprises a third preset threshold or a third preset increase rule, wherein the third preset threshold is set such that the proportion value that the target sub-resource accounts for in the first storage resource amount is greater than a minimum value of the proportion value that the target sub-resource accounts for in the first storage resource amount, which constitutes a resource leak, wherein the third preset increase rule is set such that an increase trend change of the proportion value that the target sub-resource accounts for in the first storage resource amount in a resource period constitutes a resource leak, wherein the resource period is a life cycle in which the target resource occupies storage space, and wherein the determining whether the proportion value satisfies the third preset condition comprises:

determining whether the proportion value is greater than the third preset threshold; and determining that the proportion value satisfies the third preset condition in response to the proportion value being greater than the third preset threshold.

6. The method according to claim 4, wherein the third preset condition comprises a third preset threshold or a third preset increase rule, wherein the third preset threshold is set such that the proportion value that the target sub-resource accounts for in the first storage resource amount is greater than a minimum value of the proportion value that the target sub-resource accounts for in the first storage resource amount, which constitutes a resource leak, wherein the third preset increase rule is set such that an increase trend change of the proportion value that the target sub-resource accounts for in the first storage resource amount in a resource period constitutes a resource leak, wherein the resource period is a life cycle in which the target resource occupies storage space, and wherein the determining whether the proportion value satisfies the third preset condition comprises:
   determining whether the proportion value satisfies the third preset increase rule in the resource period; and
   determining that the proportion value satisfies the third preset condition in response to the proportion value satisfying the third preset increase rule in the resource period.

7. A resource leak detection apparatus, comprising:
a processor configured to:
   obtain a target resource called in response to a target code of a program running, wherein the target code is partial code in a program code;
   determine a first storage resource amount occupied by the target resource;
   determine whether the first storage resource amount occupied by the target resource satisfies a first preset condition, wherein the first preset condition is set such that the first storage resource amount occupied by the target resource constitutes a resource leak; and
   determine a storage location of the target code as a resource leak location in response to the first storage resource amount occupied by the target resource satisfying the first preset condition, wherein the target resource comprises at least two target sub-resources, wherein the target sub-resources are partial resources that are called in a process of running the target code and that are in the target resource, and wherein the processor is further configured to:
   obtain a calling path on which a target sub-resource of the at least two target sub-resources is called in response to the target code running;
   determine a proportion value that the target sub-resource accounts for in the first storage resource amount;
   determine whether the proportion value that the target sub-resource accounts for in the first storage resource amount satisfies a second preset condition, wherein the second preset condition is such that the proportion value that the target sub-resource accounts for in the first storage resource amount constitutes a resource leak; and
   determine the calling path on which the target sub-resource is called as a resource leak calling path in response to the proportion value that the target sub-resource accounts for in the first storage resource amount satisfying the second preset condition.

8. The apparatus according to claim 7, wherein the second preset condition comprises a second preset threshold or a second preset increase rule, wherein the second preset threshold is set such that a proportion value of the first storage resource amount is greater than a minimum value of the proportion value that the target sub-resource accounts for in the first storage resource amount, which constitutes a resource leak, wherein the second preset increase rule is set such that an increase trend change of the proportion value that the target sub-resource accounts for in the first storage resource amount in a resource period constitutes a resource leak, wherein the resource period is a life cycle in which the target resource occupies storage space, and wherein the processor is further configured to:
   determine whether the proportion value that the target sub-resource accounts for in the first storage resource amount is greater than the second preset threshold; and
   determine whether the proportion value that the target sub-resource accounts for in the first storage resource amount satisfies the second preset increase rule in the resource period.

9. A resource leak detection apparatus, comprising:
a processor configured to:
   obtain a target resource called in response to target code of a program being run, wherein the target code is partial code in a program code;
   determine a first storage resource amount occupied by the target resource;
   determine whether the first storage resource amount occupied by the target resource satisfies a first preset condition, wherein the first preset condition is set such that the first storage resource amount occupied by the target resource constitutes a resource leak; and
   determine a storage location of the target code as a resource leak location in response to the first storage resource amount occupied by the target resource satisfying the first preset condition, wherein the storage location of the target code comprises at least two storage location units, wherein each of the storage location units stores a sub-code, wherein the sub-code stored in the at least two storage location units constitutes the target code, and wherein the processor is further configured to:
   obtain a target sub-resource called in response to the sub-code stored in the storage location unit running, wherein target sub-resources called in response to the sub-code stored in the at least two storage location units running constitute the target resource;
   determine a proportion value that the target sub-resource accounts for in the first storage resource amount, wherein the target sub-resource is called in response to the sub-code stored in the storage location unit running;
   determine whether the proportion value satisfies a third preset condition, wherein the third preset condition is set such that the proportion value that the target sub-resource accounts for in the first storage resource amount constitutes a resource leak; and
   determine the storage location unit as a resource leak location unit.

10. The apparatus according to claim 9, wherein the third preset condition comprises a third preset threshold or a third preset increase rule, wherein the third preset threshold is set such that the proportion value that the target sub-resource accounts for in the first storage resource amount is greater than a minimum value of the proportion value that the target sub-resource accounts for in the first storage resource amount, which constitutes a resource leak, wherein the third preset increase rule is set such that an increase trend change of the proportion value that the target sub-resource accounts for in the first storage resource amount in a resource period constitutes a resource leak, wherein the resource period is a life cycle in which the target resource occupies storage space, and wherein the processor is further configured to:
   determine whether the proportion value is greater than the third preset threshold; and
   determine whether the proportion value satisfies the third preset increase rule in the resource period, wherein the resource period is a period in which the first storage resource amount is occupied.

\* \* \* \* \*